United States Patent [19]

Oman

[11] 4,022,244
[45] May 10, 1977

[54] IRRIGATION PURGE VALVE

[76] Inventor: William S. Oman, 5083 Vanalden, Tarzana, Calif. 91356

[22] Filed: Dec. 14, 1973

[21] Appl. No.: 424,660

[52] U.S. Cl. .............................. 137/517; 137/859
[51] Int. Cl.² ....................................... F16K 15/14
[58] Field of Search .................. 137/517, 525, 859; 251/145, 146, 147; 239/542, 546, 602; 61/12, 13; 138/44, 45, 46

[56] References Cited

UNITED STATES PATENTS

| | | | |
|---|---|---|---|
| 2,722,370 | 11/1955 | Owsen et al. | 137/525 X |
| 3,693,888 | 9/1972 | Rondas et al. | 239/542 X |
| 3,697,002 | 10/1972 | Parkison | 138/46 X |
| 3,718,152 | 2/1973 | Kraakman | 137/517 X |
| 3,753,527 | 8/1973 | Galbraith et al. | 239/542 X |
| 3,807,430 | 4/1974 | Keller | 137/859 X |

FOREIGN PATENTS OR APPLICATIONS 1,222,052 2/1971 United Kingdom ............... 137/525

Primary Examiner—William R. Cline
Attorney, Agent, or Firm—Ralph B. Pastoriza

[57] ABSTRACT

A cylindrical cap having a closed end except for a single small opening is internally threaded and arranged to receive a resilient washer and resilient disc overlying the washer. The disc has a small single opening. A coupling tube is threaded into the cap to hold the disc against the annular washer so that a small area is defined within the annular shoulder defined by the washer. The coupling tube includes a stem at its other end for connection to a lateral water line in an irrigation system. The arrangement is such that when water pressure is below a predetermined operating pressure, the water can pass through the opening in the disc and out the small opening in the end cap to purge the line. The disc and end cap openings are radially displaced such that when the water pressure equals or exceeds a predetermined operating pressure, the disc is moved into the central area within the shoulder to seat against the closed end and thus close off its single opening, thereby blocking water flow so that normal irrigation can take place.

5 Claims, 4 Drawing Figures

IRRIGATION PURGE VALVE

This invention relates to pressure responsive valves and more particularly to an improved purge valve for connection to the end of a lateral in an irrigation water system.

BACKGROUND OF THE INVENTION

It is normal practice in large irrigation systems for sugar cane fields, row crops, vineyards, orchards, and the like to provide so-called purge valves at the terminal ends of te lateral irrigation pipes. These valves permit water to flush from the ends of the laterals under low pressure conditions. When the pressure in the irrigation system reaches a given value or exceeds this value, these purge valves automatically close so that normal irrigation operations can take place.

By using purge valves, the lines are cleaned of sediment, and the like and water is simply drained from the irrigation system when not is use. In an effort to provide the desired action of dripping or draining of water under low pressure and yet positive closure under high pressure, many sophisticated designs have been proposed and some of these have actually been placed in operation. Typical of such valves are spring loaded ball type check valves or flap valves with guiding stems.

A major factor for consideration with respect to purge type valves at the end of irrigation lines is the actual expense in manufacturing and making available such valves. A further important consideration is reliability. In actuality, the simpler the design of the valve the more likelihood of meeting the foregoing considerations. Thus, if an extremely simple valve structure can be provided, its manufacturing expense is substantially reduced. Moreover, as a general rule, the simpler the valve structure (less moving parts or components) the more reliable will it be.

BRIEF DESCRIPTION OF THE PRESENT INVENTION

With the foregoing in mind, the present invention contemplates the provision of an improved purge type valve for insertion at the end of a lateral line in a water irrigation system which permits purging of the line under low pressure and yet which reliably closes off the flow of water from the end of the lateral when the operating water pressure equals or exceeds a given value. Moreover, the design of the valve of this invention is extremely simple resulting not only in reduces expense for manufacture but increased reliability.

More particularly, the irrigation purge valve comprises an internally threaded cylindrical cap having a closed end except for a single small opening. Means define an annular shoulder within the cap upon which is arranged to seat a resilient disc. This disc has a single opening in the closed end of the cap and the opening in the disc being radially off-set. The assembly is completed by a coupling tube having external threads for threaded engagement with the cap and a suitable stem at its other end for connection to the lateral line.

With these simple components alone, proper purging of the line will take place under low pressure conditions wherein the disc is held in spaced relationship to the closed end of the cap so that water can pass successively through the small openings in the disc and cap and when the pressure exceeds a given value, the disc will move inwardly to seat against the closed end of the cap thus closing off at least one of the small openings so that water flow is blocked.

In the preferred embodiment, the annular shoulder is defined by the provision of a simple washer inserted within the end cap.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
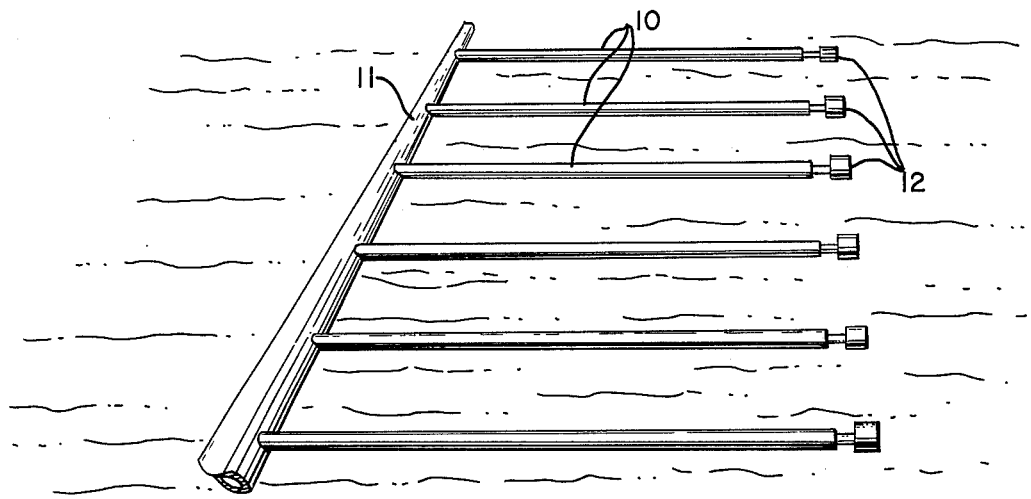
FIG. 1 is a fragmentary perspective view of an irrigation system with which the irrigation purge valve of the present invention is used.

Referring to FIG. 1 there is illustrated a typical field or orchard provided with an irrigation system which would normally include a plurality of lateral irrigation pipes 10 extending from a header pipe 11. In accord with conventional practice, there are provided valves at the ends of the laterals and in the showing of FIG. 1, these valves take the form of applicant's improved valve design as shown at 12.

As mentioned heretofore, it is desirable to have the laterals automatically purged of sediment and towards this end, the valves 12 are arranged to be open to permit flushing of the water and general purging of the lines of sediment and the like. Under a selected, given water pressure for irrigation purposes, the valves 12 will automatically close in response to the pressure.

Figure 2:
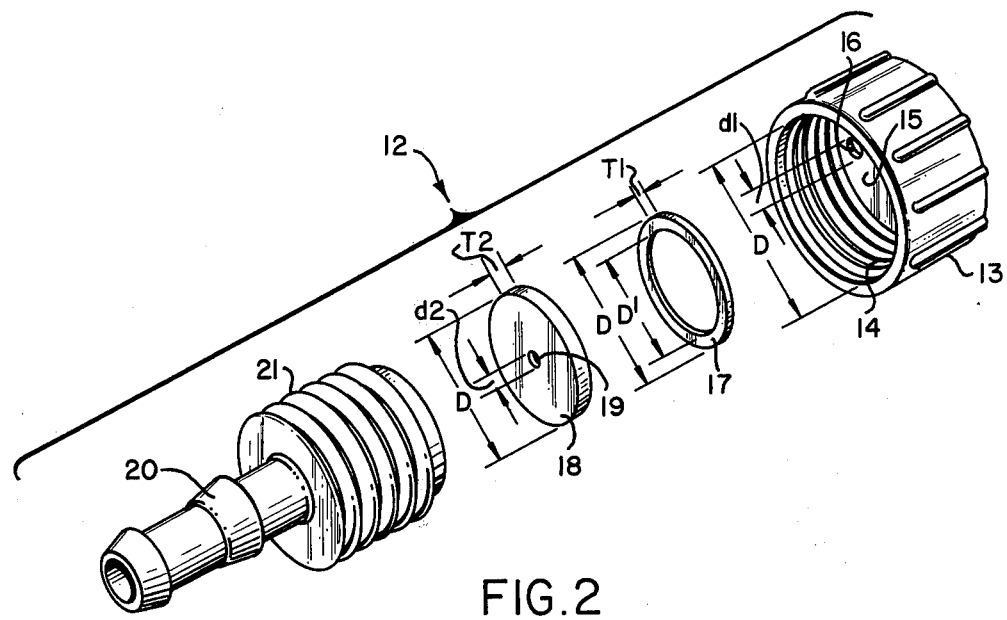
FIG. 2 is an enlarged perspective, exploded view of the basic components making up the valves used in the system of FIG. 1.

Referring now to FIG. 2, there is shown one of the valves 12 of FIG. 1. This valve takes the form of a cylindrical cap 13 internally threaded as at 14 and including a closed end 15 except for single small opening 16. In the particular embodiment described, there is provided a washer 17 arranged to seat about the internal annular wall against the closed end 16 of the cap 13 and thereby define an annular shoulder. It should be understood, however, that an annular shoulder may be initially formed in the end cap 13 rather than having the shoulder defined by the washer 17.

Cooperating with the components so far described is a resilient disc 18 having a single small opening 19. This disc is arranged to seat on the annular shoulder within the cap 13. The assembly is completed by a coupling tube including a stem portion 20 for connection to one of the laterals and an externally threaded portion 21 for threaded engagement with te internal threads 14 of the end cap 13.

An important feature of this invention resides in proper dimensioning of the various components described in FIG. 2. If the dimensioning of the components is not held within certain tolerances, the desired action will not ensue.

More particularly, and with reference to FIG. 2, if D designates the inside diameter of end cap 13, then the dimension $d1$ of the single opening 16 is between 0.05 and 0.5 the diameter D, for example 0.125 of the diameter D. The outside diameter of the washer 17 corresponds to the inside diameter of the cap 13 and thus is also designated by the letter D. The inside diameter of the washer 17 is designated D' and is from 0.5 to 0.9 its outside diameter for example 0.8 of the diameter D. The thickness of the washer 17 designated T1 which defines the heighth of the shoulder is between 0.0125 and 0.125 the inside diameter of the cap for example 0.031 this inside diameter.

Referring to the disc 18, this member also has an outside diameter D corresponding to the inside diameter of the cap 13. Its single opening 19 has a diameter $d2$ which lies between 0.05 and 0.5 the inside diameter D of the cap for example 0.155 this inside diameter. The thickness T2 of the disc 18 may be between 0.0125 and 0.2 the inside diameter of the cap, for example 0.062.

The cylindrical cap of a typical valve such as described in accord with the present invention might have an inside diameter D of 1.000 plus or minus 0.125 inches assuming that the valve is to be used with a typical ¾ inch lateral.

Figures 3, 4:
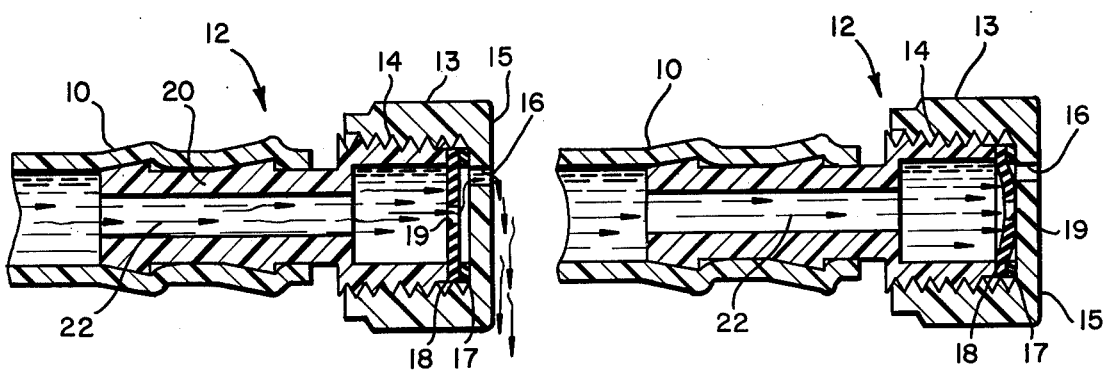
FIG. 3 is a fragmentary cross-section of the valve in operation under low pressure conditions when the valve is open; and, FIG. 4 is a view similar to FIG. 3 showing the valve under high pressure conditions when the valve is closed.

FIG. 3 shows the assembled components of FIG. 2 wherein the same numerals designate corresponding parts. It will be noted in FIG. 3 that one of the laterals 10 has been secured to the stem portion 20 of the tubular coupling, the other end of the coupling being threaded into the end cap 13. In FIG. 3 there is illustrated water flow at 22 wherein the pressure in the water system is below a selected given pressure so that purging of the various lines to which the valve is connected takes place. Thus, the water flow passes through the small opening 19 in the disc 18 to the area between the disc and closed end 15 of the cap, this small space resulting from the provision of the annular shoulder defined by the washer 17. The water then passes out the single opening 16 of the cap as also indicated by the arrows so that purging of te lines will take place.

Referring to FIG. 4, when the operating water pressure of the system increases to the selected given value for irrigation purposes, the pressure is such that the resilient disc 18 will flex or move to the right as illustrated in FIG. 4 to seat within the area inside the annular shoulder against the closed end 15 of the cap thereby blocking off the single opening 19. Water flow is thus blocked from passing out the cap.

It will be appreciated that the selected given pressure at which the foregoing described action takes place depends upon the dimensions described with respect to FIG. 2 as well as the resiliency of the disc 18. For example, if the disc 18 is fairly stiff, a much higher pressure is required to seat its central area against the cap end. Further, if the thickness of the washer or annular shoulder is increased, more pressure is required. Finally, the size of the single opening 19 in the disc will also determine the pressure at which closure takes place.

The selected given water pressure of the irrigation system at which action takes place may be, for example, between 2 and 4 pounds per square inch. The tolerance of dimensions set forth can enable by proper dimensioning the valve to close at a selected given pressure within this range. In this particular example, the disc 18 is rubber.

In all applications, the valve is preferably designed to close at a selected given pressure no greater than 75 percent of the operating pressure of the system. If this criteria is met, proper irrigation can take place and yet when the pressure drops below the 75 percent value, purging of all of the laterals will ensue.

From the foregoing description, it will be evident that the present invention has provided a greatly improved valve which can be manufactured extremely economically, has a minimum number of parts, and is thus reliable.

What is claimed is:

1. An irrigation purge valve for connection to the end of a lateral irrigation water line to which a predetermined operating water pressure is applied, said valve comprising:
    a. an internally threaded, cylindrical cap having a closed end except for a single small opening of diameter $d1$ between 0.05 and 0.50 the inside diameter D of said cap;
    b. means defining an annular shoulder of outside diameter corresponding to the inside diameter of said cap and of inside diameter D' between 0.5 and 0.9 said outside diameter, said shoulder having a thickness T1 between 0.0125 and 0.125, the inside diameter of said cap being disposed at the internal closed end of said cap;
    c. a resilient disc of outside diameter corresponding to the inside diameter of said cap and having a single small opening of diameter $d2$ between 0.05 and 0.5 the inside diameter of said cap and a thickness T2 lying between 0.0125 and 0.2 the inside diameter of said cap, said disc being seated on said annular shoulder, the single opening in said closed end of the cap and the single opening in said disc being radially off-set from each other by a distance greater than the sum of their diameters $d1$ plus $d2$, the disc having an outside diameter and thickness value T2 and being of sufficient resiliency that it can flex so that its central area engages the closed end of said cap to completely close off said single small opening in said disc; and
    d. a coupling tube having stem means at one end for connection to said lateral and externally threaded at its other end in threaded engagement with the internal threads of said cap,
whereby when the water pressure in said lateral is below a given value, water can pass through the small opening in said disc to the area inside of the shoulder and thence out the small opening in the closed end of said cap and, whereby when said water pressure exceeds said given value, the central area of said disc is moved into at least a portion of the area inside the shoulder to seat against the closed end of the cap and block water flow through the small opening in said disc and thereby block water flow through said cap.

2. A valve according to claim 1, in which said means defining said annular shoulder comprises a resilient washer inserted in said cap to seat against the inner wall of the closed end of said cap.

3. A valve according to claim 1, in which said given value is no greater than 75 percent of said pre-determined operating pressure.

4. A valve according to claim 1, in which substantially: $d1/_D$ equals 0.125; $d2/_D$ equals 0.155; $D'/_D$ equals 0.8; $T1/_D$ equals 0.031; and $T2/_D$ equals 0.062.

5. A valve according to claim 4 in which D equals 1.000 plus or minus 0.125 inches.

* * * * *